United States Patent [19]
Tom

[11] Patent Number: 5,832,465
[45] Date of Patent: Nov. 3, 1998

[54] METHOD FOR BUILDING A SELF-LEARNING EVIDENTIAL REASONING SYSTEM

[75] Inventor: Daniel Mohimm Tom, Clifton Park, N.Y.

[73] Assignee: General Electric Company, Schenectady, N.Y.

[21] Appl. No.: 834,582

[22] Filed: Apr. 7, 1997

[51] Int. Cl.$^6$ .................................................. G06F 15/18
[52] U.S. Cl. .............................. 706/51; 706/19; 706/25; 706/45; 706/52; 706/54
[58] Field of Search ................................ 706/51, 19, 52, 706/54, 25, 45

[56] References Cited

U.S. PATENT DOCUMENTS

| | | | |
|---|---|---|---|
| 5,058,033 | 10/1991 | Bosissone et al. | 706/52 |
| 5,119,318 | 6/1992 | Paradies et al. | 706/52 |
| 5,136,686 | 8/1992 | Koza | 706/13 |
| 5,541,832 | 7/1996 | Nakajima et al. | 364/148 |

OTHER PUBLICATIONS

Li et al, "Neural Network to Support Unstructured Economic Decision Process", IEEE ICNN, 1991.
"Evidential Reasoning in Foreign Exchange Rates Forecasting" by Horace Ip, et al, 1991 IEEE, pp. 152–159.
"Evidential Reasoning Neural Networks" by SM Mohiddin, et al., 1994 IEEE, pp. 1600–1606.
"Some Strategies for Explanations in Evidential Reasoning" by Hong Xu, et al, IEEE Transactions on Systems, Man and Cybernetics–Part A: Systems and Humans, vol. 26, No. 5 Sep. 1996, pp. 599–607.
"Management of Uncertainty for Intelligent Financial Systems" by E. Cortes–Rello, et al, 1991 IEEE, pp. 238–243.
"Evidential Reasoning Using Neural Networks" by C. Wang, et al, 1991 IEEE, pp. 497–502.
"Evaluation of Approximate Reasoning Methodologies" by Valerie Cross, et al, 1990 IEEE, pp. 1085–1091.
"Geniustm Automated Underwriting System: Combining Knowledge Engineering and Machine Learning to Achieve Balanced Risk Assessment" by DC Golibersuch, et al., Proceedings of the Seventh Innovative Applications of Artificial Intelligence Conference, Aug. 21–23, 1994, Montreal, Quebec, pp. 49–61.
"A Model of in Exact Reasoning in Medicine" by Edward Shortliffe, et al, Chapter 11 in Buchanan & Shortliffe, Rule–Based Expert Systems: The Mycin Experiments of the Stanford Heuristic Programming Project, Addison–Wesley, MA, 1985, pp. 233–261.
"Supervised Learning of Probability Distributions by Neural Networks" by EB Baum, et al, Proceedings of the IEEE Conference on Neural Information Processing Systems Natural & Synthetic, Denver, 1987, pp. 1–7.
"Connectionist Learning Prodcedures" by GE Hinton, Carnegie Mellon University Computer Science Department Technical Report, 1988, pp. 1–46.
"Accelerated Learning in Layered Neural Networks" by SA Solla, et al, AT&T Bell Laboratories Technical Report, 1988, pp. 1–22, 6 Figs. and 1 Table.

*Primary Examiner*—George B. Davis
*Attorney, Agent, or Firm*—David C. Goldman; Marvin Snyder

[57] ABSTRACT

The present invention discloses a method for building a self-learning evidential reasoning system from examples. In this invention a hierarchical model structure for the self-learning evidential reasoning system is defined. After the model structure has been defined examples are supplied by experts. The examples are entered directly into example spreadsheets and then used to train the model structure. The model structure is then trained to minimize error between model output and the desired output. The error is minimized by using a gradient descent optimization. The model structure is then put into production and then used to make a recommendation. The self-learning evidential reasoning system can be used in various fields, such as analyzing the risk of financial service applications.

6 Claims, 10 Drawing Sheets

|  |  | Overall Credit Opinion | | | | |
|---|---|---|---|---|---|---|
|  |  | Example-Based Expert Input | | | | |
|  | High | High | Good | Good | OK | 1: Strong |
|  | Medium | Medium | Medium | Medium | Poor | 2: Medium |
|  | Low | Low | Poor | Poor | Abominable | 3: Weak |
| Deal # | Employer Stability | Residence Stability | Income Ability to Pay | Credit | Severe Credit Opinion | Credit Worthiness |
| 1 | High | Low | Poor | Good | Poor |  |
| 2 | High | Low | Good | Medium | Poor |  |
| 3 | High | Medium | Medium | Medium | OK |  |
| 4 | High | Low | Medium | Medium | Poor |  |
| 5 | Medium | Medium | Good | Good | Abominable |  |
| 6 | Medium | High | Poor | Poor | Poor | Weak |
| 7 | Medium | High | Medium | Poor | Abominable |  |
| 8 | High | Low | Medium | Medium | OK |  |
| 9 | Low | Medium | Medium | Good | Poor |  |
| 10 | High | Medium | Medium | Medium | Poor |  |
| 11 | High | Low | Poor | Poor | Poor |  |
| 12 | High | Medium | Poor | Poor | Abominable |  |
| 13 | High | Low | Good | Poor | Abominable |  |
| 14 | Medium | Low | Good | Medium | OK |  |
| 15 | High | Low | Good | Good | OK |  |
| 16 | Medium | Low | Medium | Good | OK |  |
| 17 | Medium | High | Poor | Good | Poor |  |
| 18 | Low | High | Poor | Poor | OK |  |
| 19 | Medium | Medium | Good | Good | Poor |  |
| 20 | High | Medium | Good | Poor | OK |  |
| 21 | Low | Medium | Good | Medium | OK |  |
| 22 | High | Low | Medium | Good | Abominable |  |
| 23 | Low | Medium | Good | Good | OK |  |
| 24 | Low | Low | Poor | Poor | Poor |  |
| 25 | Low | Low | Medium | Poor | Abominable |  |
| 26 | High | Low | Medium | Good | Poor |  |
| 27 | High | High | Medium | Medium | Poor |  |
| 28 | Low | High | Good | Poor | Poor |  |
| 29 | High | Low | Good | Good | Poor |  |
| 30 | Medium | Low | Good | Poor | Poor |  |
| 31 | Medium | Medium | Poor | Poor | Abominable |  |
| 32 | Medium | High | Good | Poor | OK |  |

*FIG. 3a*

| | | Overall Credit Opinion | | | | |
| | | Example-Based Expert Input | | | | |
| | | | | | | |
| | High | High | Good | Good | OK | 1: Strong |
| | Medium | Medium | Medium | Medium | Poor | 2: Medium |
| | Low | Low | Poor | Poor | Abominable | 3: Weak |
| | | | | | | |
| Deal # | Employmer Stability | Residence Stability | Income Ability to Pay | Credit | Severe Credit Opinion | Credit Worthiness |
| 32 | Medium | High | Good | Poor | OK | |
| 33 | High | Medium | Good | Medium | OK | |
| 34 | Low | Low | Poor | Poor | OK | |
| 35 | High | Medium | Poor | Good | Poor | |
| 36 | Medium | Low | Medium | Poor | OK | |
| 37 | High | High | Medium | Poor | Poor | |
| 38 | Medium | High | Medium | Poor | OK | |
| 39 | Medium | Low | Medium | Medium | Poor | |
| 40 | High | Medium | Good | Medium | Poor | |
| 41 | High | High | Medium | Medium | Poor | |

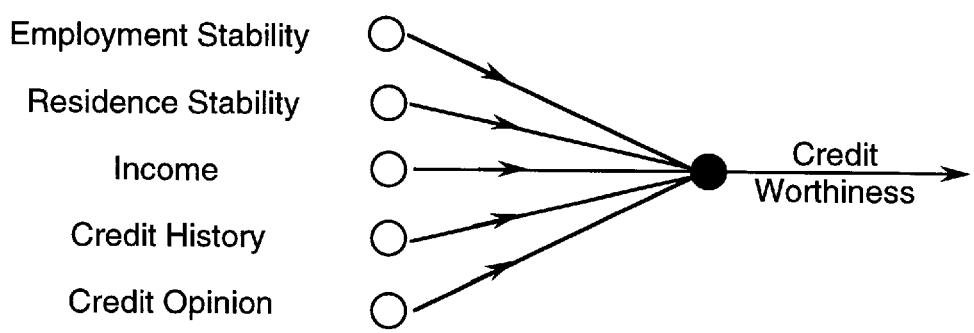

FIG. 3b

| | | Demographics-Employment Example- Based Expert Input | | | |
|---|---|---|---|---|---|
| | >3 Yr. | >3 Yr. | Stable | 1- High | |
| | 1-3 Yr. | 1-3 Yr. | Unsavory | 2 - Medium | |
| | <1 Yr. | <1 Yr. | Un-garnishable | 3 - Low | |
| | | | Seasonal | | |
| Deal # | Current Job Time | Previous Job Time | Employment | Employment Stability | |
| 1 | <1 Yr. | >2 Yr. | Un-garnishable | | |
| 2 | >3 Yr. | <1 Yr. | Seasonal | | |
| 3 | >3 Yr. | >2 Yr. | Un-garnishable | | |
| 4 | >3 Yr. | 1-2 Yr. | Un-garnishable | | |
| 5 | >3 Yr. | >2 Yr. | Unsavory | | |
| 6 | >3 Yr. | >2 Yr. | Seasonal | | |
| 7 | >3 Yr. | >2 Yr. | Stable | | |
| 8 | 1-3 Yr. | <1 Yr. | Stable | | |
| 9 | <1 Yr. | <1 Yr. | Stable | | |
| 10 | >3 Yr. | >2 Yr. | Seasonal | | |
| 11 | <1 Yr. | <1 Yr. | Un-garnishable | | |
| 12 | >3 Yr. | 1-2 Yr. | Seasonal | | |
| 13 | <1 Yr. | <1 Yr. | Seasonal | | |
| 14 | 1-3 Yr. | 1-2 Yr. | Un-garnishable | | |
| 15 | <1 Yr. | <1 Yr. | Un-garnishable | | |
| 16 | <1 Yr. | <1 Yr. | Stable | | |
| 17 | >3 Yr. | >2 Yr. | Stable | | |
| 18 | 1-3 Yr. | >2 Yr. | Un-garnishable | | |
| 19 | >3 Yr. | 1-2 Yr. | Stable | | |
| 20 | >3 Yr. | 1-2Yr. | Seasonal | | |
| 21 | >3 Yr. | <1 Yr. | Un-garnishable | | |
| 22 | <1 Yr. | <1 Yr. | Unsavory | | |
| 23 | >3 Yr. | >2 Yr. | Un-garnishable | | |
| 24 | <1 Yr. | 1-2 Yr. | Stable | | |
| 25 | <1 Yr. | >2 Yr. | Un-garnishable | | |

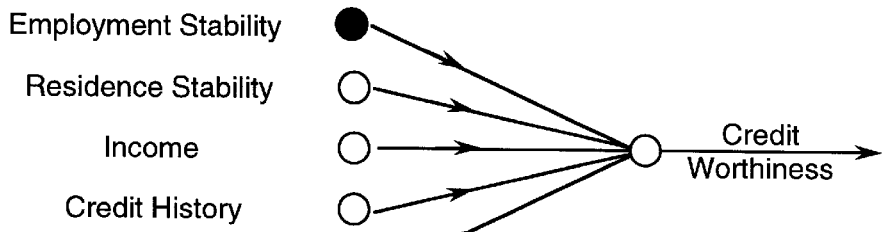

FIG. 3c

| Variable | Value | Input Nodes ||| Output Node ||
| | | Input | Evidence | Output | Input | Evidence | Output |
|---|---|---|---|---|---|---|---|
| Years At Current Address | 02 | -0.4258 | | | | | |
| Years At Previous Address | 0 | -1 | | | | | |
| Residence Type | R | -1 | | | | | |
| Residence | | | 0.2415 | 0.814 | -0.814 | | |
| Years At Current Employment | 08 | 0.2584 | | | | | |
| Years At Previous Employment | 0 | -1 | | | | | |
| Occupation Code | 02 | 0.0059 | | | | | |
| Annual Income | 30396 | -0.8652 | | | | | |
| Employment | | | 0.0185 | -0.0624 | -0.0624 | | |
| Disposable Income | 24317 | -0.7086 | | | | | |
| Income/Cap | 2.18 | -0.683 | | | | | |
| Long Term DR | 0.59 | 0.5724 | | | | | |
| Debt Ratio | 0.20 | 0.7496 | | | | | |
| Debt | | | 0.9568 | 0.9576 | 0.9576 | | |

FIG. 7a

| Variable | Value | Input Nodes | | | | Output Node | |
|---|---|---|---|---|---|---|---|
| | | Input | Evidence | Output | Input | Evidence | Output |
| Number of Inquiries (past 6 mos.) | 00 | 1 | | | | | |
| Number Too New | 00 | 1 | | | | | |
| Number of Derogatory Remarks | 01 | -0.7012 | | | | | |
| Number of Trades 30 Days Late | 00 | 1 | | | | | |
| Number of Trades 60 Days Late | 01 | -0.9602 | | | | | |
| Number of Trades 90 Days Late | 02 | -0.9948 | | | | | |
| Number of Bank Loans | 1 | 0.7526 | | | | | |
| Number of Finance Loans | 2 | -0.008 | | | | | |
| Number of Revolving Loans | 3 | -0.9378 | | | | | |
| Credit | | | 0.2058 | 0.224 | 0.224 | | |
| Number of Dependents | 00 | -1 | | | | | |
| Previous Vehicle | N | 1 | | | | | |
| Bankrupt | N | 1 | | | | | |
| KeyRBC | N2 | -0.0617 | | | | | |
| Misc | | | 0.0891 | 0.1414 | 0.1414 | | |
| Overall Output | | | | | | 0.5797 | 0.98308 |

FIG. 7b

METHOD FOR BUILDING A SELF-LEARNING EVIDENTIAL REASONING SYSTEM

FIELD OF THE INVENTION

The present invention relates generally to expert systems and more particularly to a method for building a self-learning evidential reasoning system from examples.

BACKGROUND OF THE INVENTION

Evidential reasoning is an artificial intelligence methodology that starts with a hierarchical description of a decision process used in a particular field such as business, engineering, or the like. The hierarchical description is used to develop a model structure represented by a plurality of processing nodes. Each node in the model structure represents an intermediate or final consideration and opinion used in the decision process. Each node contains a number of attributes describing factors to be considered for that node. Each attribute has a number of possible linguistic evidential values. The linguistic evidential values are converted to numeric evidential values at the nodes. The numeric evidential values express a degree to which the linguistic evidential values support a particular hypothesis for the attributes. Typically, there can be a high belief, a medium belief, or a low belief that the linguistic evidential values support the hypothesis. The numeric evidential values for all of the attributes in a node are combined and used to formulate an opinion for the node. The opinion from each node is then propagated to the next higher level node where it becomes the linguistic evidential value for the appropriate attribute in that higher level node. The linguistic evidential values at the higher level nodes are then converted to numeric evidential values and combined at the nodes to formulate additional opinions. This process continues until a final opinion is formulated at the highest level node in the model structure.

The combination of the numeric evidential values at the nodes to formulate an opinion is accomplished by using a non-linear algorithm. The MYCIN function is one type of non-linear algorithm that has been used to combine numeric evidential values. The MYCIN function resembles a special case in the Dempster-Schaffer Theory of Evidence. The MYCIN function is adapted from the certainty theory work set forth in Shortliffe et al., *A Model of Inexact Reasoning in Medicine*, RULE-BASED EXPERT SYSTEMS: THE MYCIN EXPERIMENTS OF THE STANFORD HEURISTIC PROGRAMMING PROJECT, Chapter 11. A drawback associated with using the MYCIN function in evidence combination is that it is very complicated and requires many calculations. Another problem with using the MYCIN function in an evidential-based reasoning system is that the functions at each of the nodes have to be optimized in order to generate a final opinion that best reflects an expert's opinion. Optimization typically requires a gradient calculation and since the MYCIN function needs a lot of calculations, the gradient computation becomes intractable. Therefore, in order to optimize the evidential-based reasoning system, the MYCIN functions at the nodes have to be adjusted manually by trial and error, which is very time consuming. Accordingly, there is a need to be able to reformulate the evidential combination functions used in an evidential-based reasoning system in order to optimize the system.

SUMMARY OF THE INVENTION

In accordance with this invention, there is provided a method for building a self-learning evidential reasoning system. In this method a hierarchical model structure for the self-learning evidential reasoning system is defined. The hierarchical model structure has a plurality of processing nodes each having a set of inputs and an output. The outputs from the lower level processing nodes are propagated as inputs to the higher level processing nodes until a final output is generated from the highest level processing node in the hierarchical model structure. A number of attributes for each of the plurality of processing nodes are then specified. Each attribute describes a factor to be considered by that processing node. A number of possible linguistic evidential values are then specified for each of the attributes. A plurality of examples for each of the processing nodes in the hierarchical model structure are then collected. Each of the plurality of examples have a set of inputs and a corresponding desired output. The processing nodes are then trained with the plurality of examples such that the model structure learns to generate a final output from a set of inputs. The model structure is trained to have minimal error between the final output and the desired output for the plurality of examples. The training comprises providing a linguistic evidential value for each of the inputs in the plurality of examples. The linguistic evidential values are translated into an evidential numeric value. A weighting function is then determined for each processing node and used to aggregate the evidential numeric values into an evidential numeric aggregate value. The weighting functions for each of the processing nodes in the model structure are then optimized until there is minimal error between the final output and the desired output for the plurality of examples.

In accordance with a second embodiment of this invention, there is provided a method for building a self-learning evidential reasoning system for performing risk and credit analysis of financial service applications. In this embodiment, a hierarchical model structure having an input layer of processing nodes and an output layer having a processing node coupled to each of the processing nodes in the input layer is defined. A plurality of examples are collected from a plurality of previously approved financial service applications. Each example has a set of inputs and a corresponding desired output. The plurality of examples are organized into a plurality of groups used to perform risk and credit analysis. Each of the plurality of groups are applied to separate input layer processing nodes. The processing nodes are trained with the plurality of groups such that the model structure learns to generate a final output from a set of inputs. The model structure is trained to have minimal error between the final output and the desired output for the plurality of examples. The training comprises the steps of providing a linguistic evidential value for each of the inputs in the plurality of examples. The linguistic evidential values are translated into an evidential numeric value. A weighting function is determined for each processing node for aggregating the evidential numeric values into an evidential numeric aggregate value. The weighting functions for each of the processing nodes in the model structure are optimized until there is minimal error between the final output and the desired output for the plurality of examples.

DESCRIPTION OF THE DRAWINGS

FIGS. 3a–3c show examples of example spreadsheets;

FIG. 7 shows an example of a financial service application evaluated in the production phase of one embodiment of this invention.

DETAILED DESCRIPTION OF THE INVENTION

Figure 1:
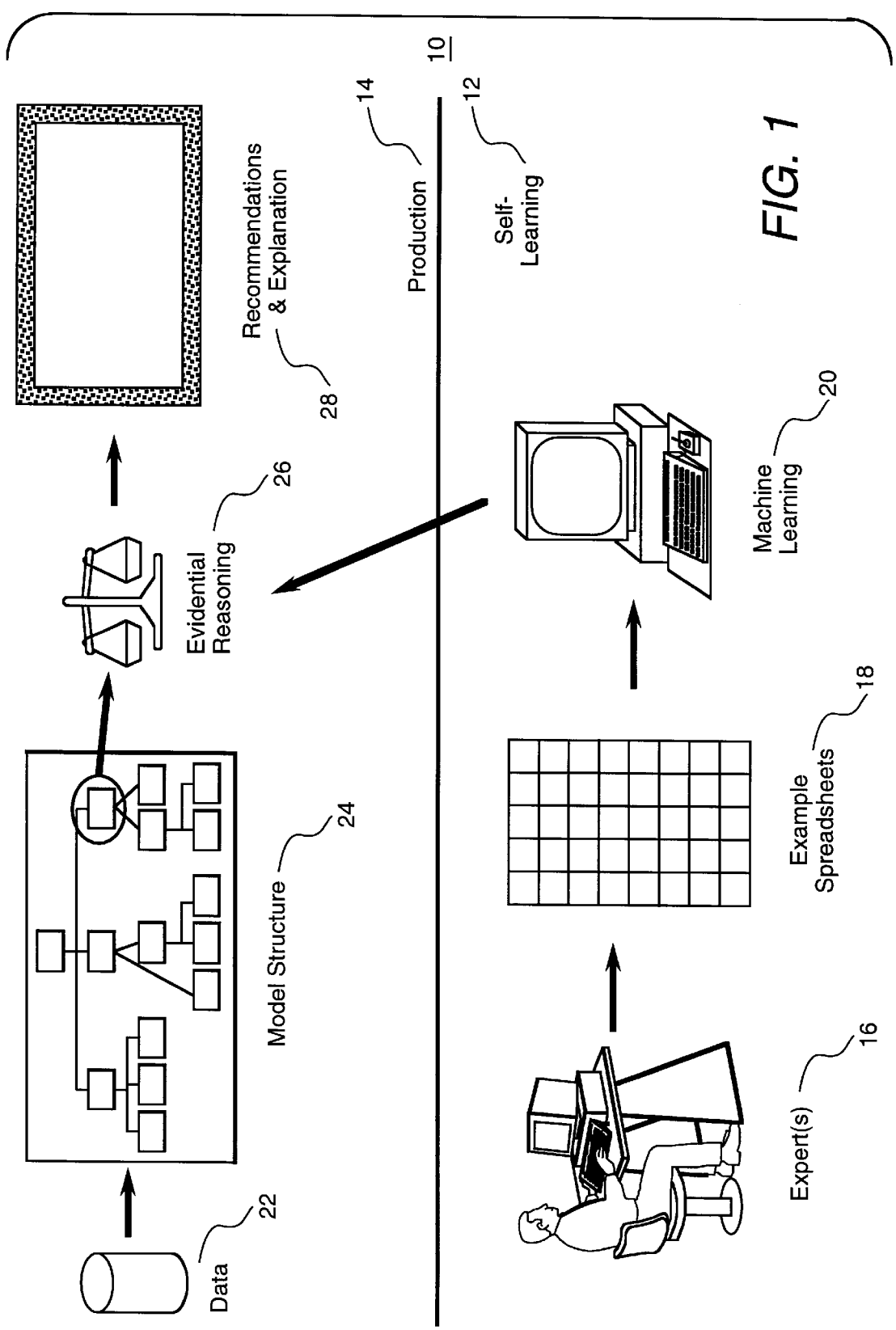
FIG. 1 shows a block diagram of an example-based evidential reasoning system.

FIG. 1 shows a block diagram of an example-based evidential reasoning system 10. The example-based evidential reasoning system 10 includes a training or self-learning phase 12 and a production phase 14. In the self-learning phase 12, the knowledge of experts 16 in a particular field such as business, engineering, or the like is acquired and used to develop a knowledge base. For purposes of illustrating this invention, the particular field that is described herein is business related; more specifically, the risk analysis of financial service applications for car loans. This invention is not limited to risk analysis and can be used in other fields of business as well as in other fields such as science, medicine, engineering, etc. Thus, in the illustrative embodiment, experts in the field of analyzing financial service applications for risk analysis are captured. The experts define a hierarchical model structure of the decision logic used to analyze the risk of a financial service application. In this embodiment, the model structure has an input layer of processing nodes and an output layer having a processing node coupled to each of the input layer processing nodes.

After the model structure has been defined, a number of attributes describing a factor to be considered in the risk analysis are specified by the experts for each node. In addition, a number of possible linguistic evidential values for the attributes are specified by the experts, The experts supply various examples for each of the nodes. The examples are entered directly into example spreadsheets 18. The example spreadsheets are then transferred into a learning machine 20 such as a personal computer or workstation, where the examples are used to learn the decision process used by the experts to analyze a financial service application. More specifically, an understanding is developed on how the linguistic evidence values are combined at each node and on how the combined evidence values are interpreted. After this understanding has been learned, it is then used in the production phase 14. During the production phase 14 data is transferred from a data storage unit 22 and entered into the example-based evidential reasoning system. In particular, the data from a financial service application is entered into the model structure 24 and the system 10 then weighs the evidence in the application at the evidential reasoning unit 26 according to what has been learned in the self-learning phase. A recommendation along with an explanation is then made at the recommendation unit 28.

Figure 2:
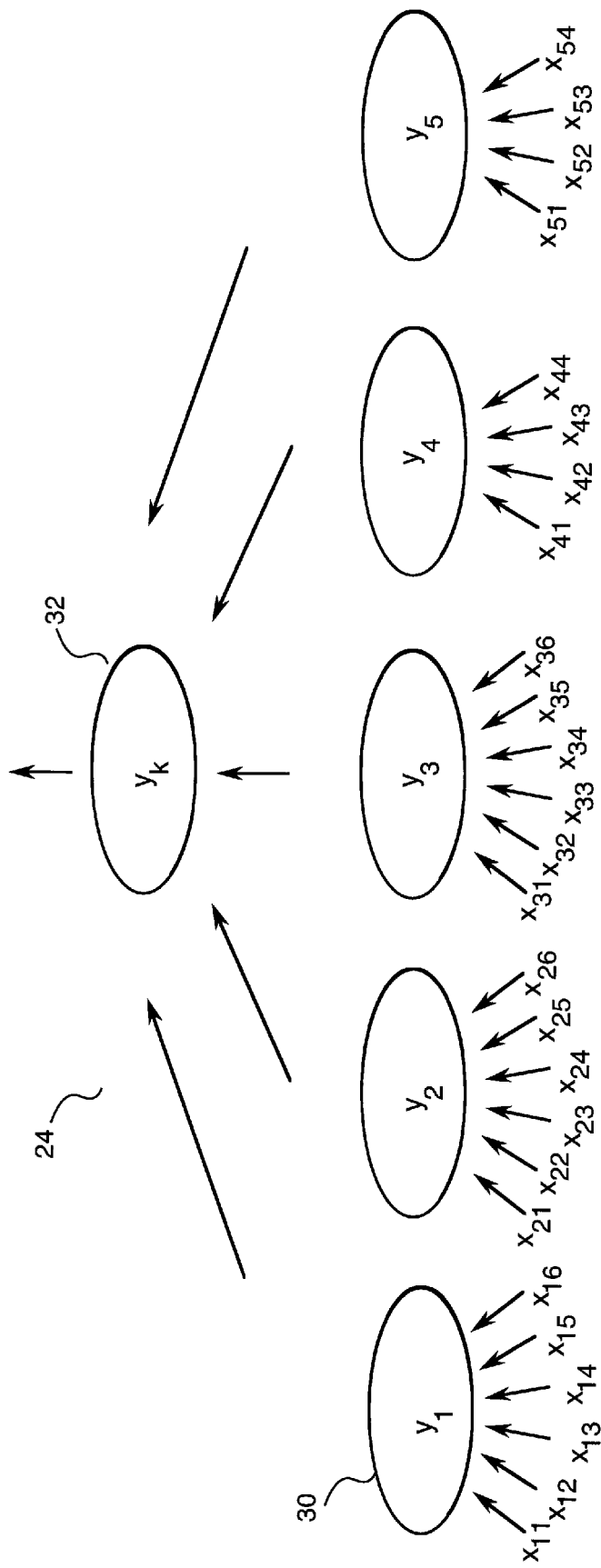
FIG. 2 shows an example of model structure.

FIG. 2 shows an example of the model structure 24 used to analyze a financial service application. The model structure includes an input layer of processing nodes 30 and an output layer having a processing node 32 connected to each of the input layer processing nodes. Each processing node in the input layer receives linguistic evidential data from the previously filed financial service applications. The linguistic evidential data is pre-processed and organized into a plurality of groups comprising employment stability, residence stability, credit history, debt & income, and miscellaneous. Then the linguistic evidential data are applied to the input layer of processing nodes 30. In the illustrative embodiment, the input layer comprises five processing nodes that each receive different linguistic evidential data according to a specific group. For example, processing node $y_1$ receives linguistic evidential data (i.e., $x_{11} \ldots x_{16}$) for the employment stability group, processing node $Y_2$ receives linguistic evidential data (i.e., $x_{21} \ldots x_{25}$) for the residence stability group, processing node $y_3$ receives linguistic evidential data (i.e., $x_{31} \ldots x_{35}$) for the credit history group, processing node $y_4$ receives linguistic evidential data (i.e., $x_{41} \ldots x_{44}$) for the debt and income group, and processing node $y_5$ receives linguistic evidential data (i.e., $x_{51} \ldots x_{54}$) for the miscellaneous group.

The linguistic evidential data in the employment stability group (i.e., $x_{11} \ldots x_{16}$) may include years at current employment, years at previous employment, primary occupation category, and total income. The linguistic evidential data in the residence stability group (i.e., $x_{21} \ldots x_{25}$) may include years at current address, years at previous address, whether the applicant owns, rents, or lives in the residence. The linguistic evidential data in the income and debts group (i.e., $x_{31} \ldots x_{35}$) may include disposable income, income/capitalized vehicle cost ratio, mortgage/long term debt ratio, debt to income ratio. The linguistic evidential data in the credit history group (i.e., $x_{41} \ldots x_{44}$) may include number of credit bureau inquiries, number of accounts too new to rate, number of derogatory remarks, number of accounts 30 days late, number of accounts 60 days late, number of accounts 90 days late, number of bank loans, number of finance loans, and number of revolving loans. Some of the evidential data in the miscellaneous group (i.e., $x_{51} \ldots x_{54}$) may include prior repossessions or bankruptcy indicator, prior automobiles purchased indicator, car versus truck or van, number of dependents, etc. The linguistic evidential data designated for these input processing nodes are not limited to these attributes and may have other attributes if desired.

Each input processing node translates the linguistic evidential data into a numeric value and combines the numeric values into an aggregate evidential data value. The aggregate evidential data value is then mapped to a linguistic evidential data. The linguistic evidential data is then transferred from each input layer processing node to the output layer processing node 32 and used as an input. The output layer processing node then translates the linguistic evidential data into a numeric value and combines the numeric values into an aggregate evidential data value. Then the aggregate evidential data value is mapped to a linguistic evidential data value, which is the final output of the model structure. The model structure can take the form of another structure and is not limited to the representation disclosed herein. More specifically, the hierarchy of the model structure depends on the particular field of use and decision process used by experts in that area.

After the model structure has been defined, various examples of evidential data for each group in a node are supplied by the experts. The examples are entered directly into example spreadsheets. FIGS. 3a–3b show examples of example spreadsheets. FIG. 3a is an example spreadsheet for the model structure 24. In this spreadsheet, the input processing nodes are employment stability, residence stability, income:ability to pay, credit history, and severe credit opinion. These input processing nodes are set forth in the columns of the spreadsheets. Each of these processing input nodes have a set of possible linguistic evidential values. For example, the possible set of linguistic evidential values for the employment stability input processing node are "high", "medium", and "low". The possible set of linguistic evidential values for the residence stability input processing node are "high", "medium", and "low". The possible set of linguistic evidential values for the income:ability to pay input processing node are "good", "medium", and "poor". The possible set of linguistic evidential values for the credit history input processing node are "good", "medium", and "poor". The possible set of linguistic evidential values for the severe credit opinion input processing node are "OK", "poor", and "abominable". The possible set of linguistic evidential values for these input processing nodes are not limited to these values and may have other values if desired.

In the spreadsheet of FIG. 3a, the output processing node is credit worthiness. The possible set of linguistic evidential values for the credit worthiness output processing node are "strong", "medium", and "weak". A number of different examples are then entered into this spreadsheet by the experts. The examples are represented in this spreadsheet as deals. In FIG. 3a there are 41 different examples. The experts review each of the examples and determine what the credit worthiness (i.e., the output) of the example is. For instance, deal number six has a "medium" evidential value for the employment stability input node, a "high" evidential value for the residence stability input node, a "poor" evidential value for the income: ability to pay input node, a "poor" evidential value for the credit history input node, and a "poor" evidential value for the severe credit opinion input node. The experts after weighing these evidential values decided that the credit worthiness of this particular example is weak. Each of the remaining examples in FIG. 3a are analyzed by the experts in the same manner as in deal number six, i.e., weighing the input linguistic evidential values and determining the credit worthiness.

In addition to the example spreadsheet for the overall model structure, there are example spreadsheets for each input processing node in the structure. FIG. 3b is an example spreadsheet for the employment stability input processing node. In this spreadsheet, the linguistic evidential data inputted to the employment stability processing node are time at the current job, time at the previous job, and the type of employment. These linguistic evidential data are set forth in the columns of the spreadsheet. Each of these linguistic evidential data inputs are arranged into a bin of possible linguistic evidential values. For example, the possible bin of linguistic evidential values for the time at the current job are ">3 years", "1–3 years", and "<1 year". The possible bin of linguistic evidential values for the time spent at the previous job are ">3 years", "1–3 years", and "<1 year". The possible bin of linguistic evidential values for the type of employment are "stable", "unsavory", "un-garnishable", and "seasonal". The possible bin of linguistic evidential values for these linguistic evidential inputs are not limited to these values and may have other values if desired. A number of different examples are then entered into this spreadsheet by the experts. The examples are represented in this spreadsheet as deals. In FIG. 3b there are 25 different examples. The experts review each of the examples (i.e., weigh the evidential values) and assign a linguistic evidential value for the example's employment stability. The possible set of linguistic evidential values for the employment stability node as shown in FIG. 3a are "high", "medium", and "low". Example spreadsheets for all of the other input processing nodes in the model structure are done in the same manner as set forth in FIG. 3b.

The linguistic evidential values are then taken from the example spreadsheets and transferred into the learning machine 20, where the examples are used to learn the decision process of the experts. The decision process is learned by training the processing nodes with the examples. Gradually an understanding is developed on how the linguistic evidential data values for each input processing node are combined, as well as an understanding on how the combined linguistic evidential data values are interpreted. In addition, an understanding is developed on how the linguistic evidential values generated at each input processing node are combined at the output processing node. The training begins by providing the linguistic evidential data values from the example spreadsheets for each of the input processing nodes. The linguistic evidential data values for each input processing node are then translated into an evidential numeric value. The evidential numeric values correspond to the linguistic evidential values and have values ranging between −1.0 and 1.0. One possible example of an evidential translation for the employment stability processing node is if the linguistic evidential data for the time spent at current job is ">3 years", then the numeric evidence value is 0.5. Other possible evidential translations for this attribute are if the linguistic evidential data is "1–3 years", then the numeric evidence value is 0.1 and the linguistic evidential data is "<1 year", then the evidence is −0.3. Other possible evidential translations are possible if desired. Similar evidential translation are performed for each of the linguistic evidential inputs at each of the input processing nodes in the model structure.

Once all of the linguistic evidential data values at the input processing nodes have been translated into an evidential numeric value, then the numeric values are combined using an evidence aggregation function. Since the evidential numeric values have a range between −1.0 and 1.0, the evidential aggregation value derived by the evidence aggregation function will be between −1.0 and 1.0. Next, the evidential aggregation value is mapped to a linguistic evidential value using a mapping function. One possible mapping for the employment stability input processing node is if the aggregate evidential value is greater than 0.7, then the linguistic evidential output value is "high". Other possible mappings are if the aggregate evidential value is between −0.6 and 0.7, then the linguistic evidential output value is "medium" and if the aggregate evidential value is less than −0.6, then the linguistic evidential output value is "low".

The linguistic evidential output value from each input processing node in the input layer is then inputted to the output layer processing node (i.e., credit worthiness), where the linguistic evidential values generated therefrom are translated to a numeric value. Again, the evidential numeric values correspond to the linguistic evidential values and have values ranging between −1.0 and 1.0. One possible example of an evidential translation for the credit worthiness processing node is if the linguistic evidential data for the employment stability node is "medium", then the numeric evidence value is 0.1. If the linguistic evidential data for the resident stability node is "high", then the numeric evidence value is 0.5. If the linguistic evidential data for the income-:ability to pay node is "poor", then the numeric evidence value is −0.3. If the linguistic evidential data for the credit history node is "poor", then the numeric evidence value is −0.3. If the linguistic evidential data for the severe credit opinion node is "poor", then the numeric evidence value is −0.3. After the linguistic evidential values have been translated to numeric values, then the values are aggregated to a final evidential output value using an evidence aggregation function. The aggregated evidential value will also have a value in the range between −1.0 and 1.0. Next, the evidential aggregation value is mapped to a linguistic evidential value using a mapping function. One possible mapping for the credit worthiness output processing node is if the aggregate evidential value is greater than 0.7, then the linguistic evidential output value is "strong". Other possible mappings are if the aggregate evidential value is between −0.6 and 0.7, then the linguistic evidential output value is "medium" and if the aggregate evidential value is less than −0.6, then the linguistic evidential output value is "weak". Essentially, the final linguistic evidential output value recommends whether the financial service application should be accepted or denied.

Figure 4A:
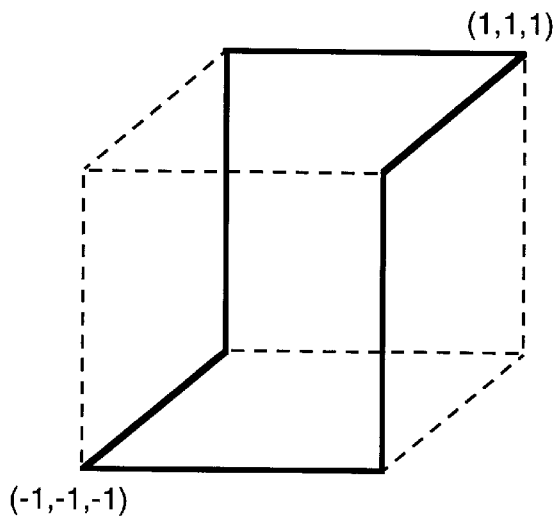
FIGS. 4a–4b show the structure and response surface of a MYCIN function.
Figure 4B:
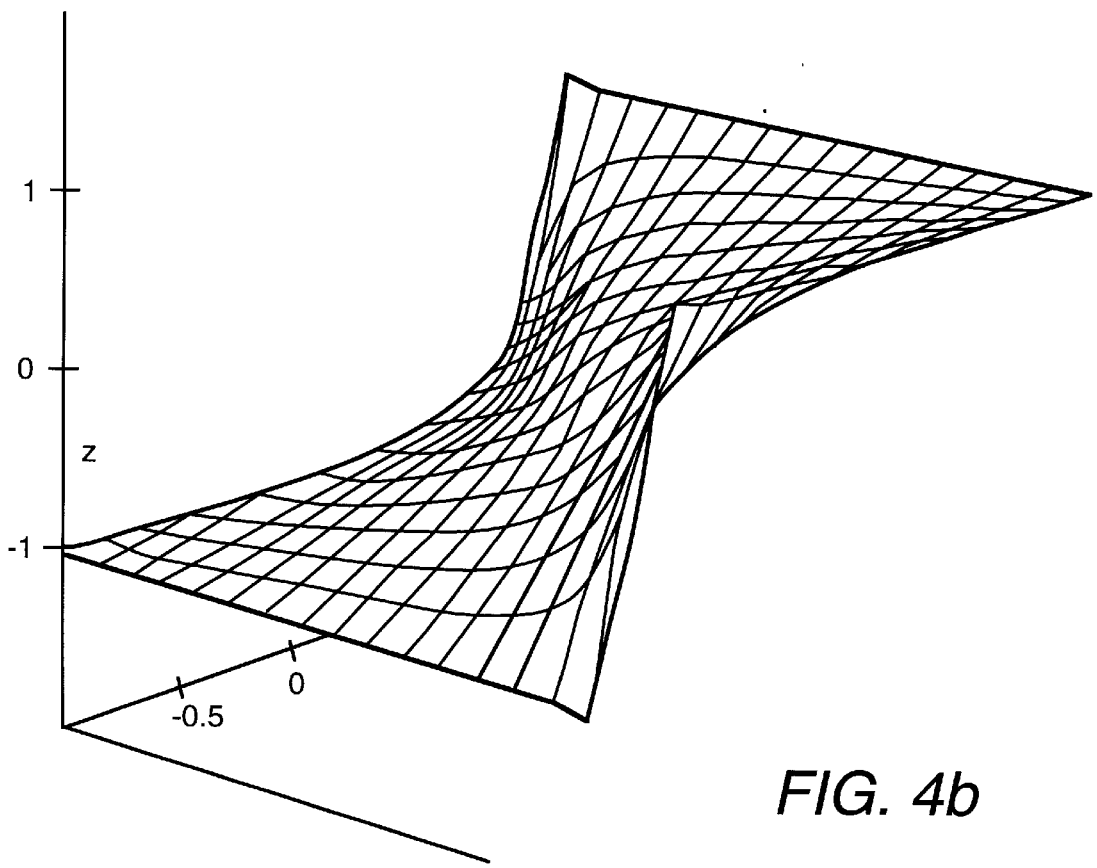
Figure 5A:
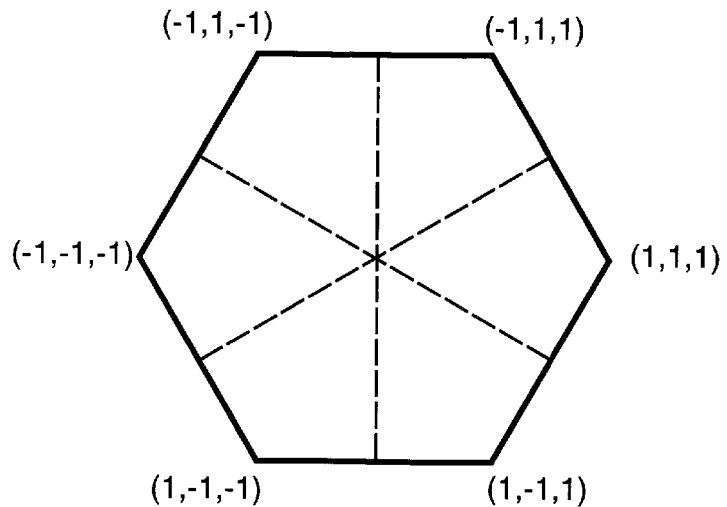
FIGS. 5a–5b show the structure and response surface of the evidential aggregation function used in this invention.
Figure 5B:
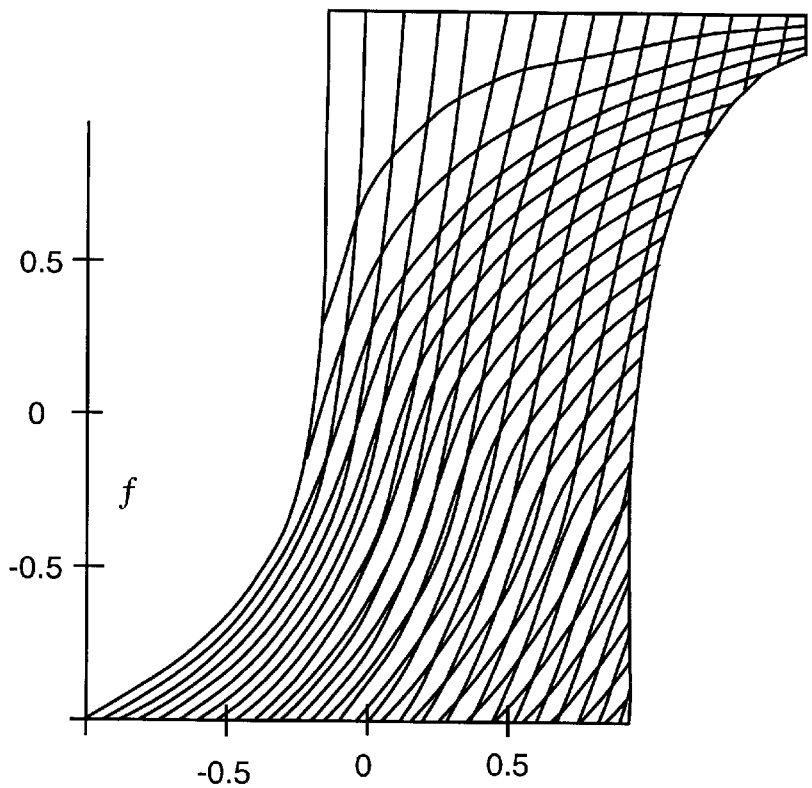

Optimizing the self-learning phase requires that the translation and mapping functions closely match the examples provided by the experts. This invention is able to optimize the self-learning phase without enduring the trial and error process of manually changing the translation and mapping functions as associated with the MYCIN function. The MYCIN function is a hypersurface stretched over a number of contiguous edges of a hypercube. For an example having two inputs, the MYCIN function specifies a surface stretched over six of the twelve edges of the hypercube. FIG. 4a shows the hypercube stretched over six of the twelve edges and FIG. 4b shows the response surface of the MYCIN function in the third dimension. If the edge structure of the hypercube is viewed from a different perspective angle, then a hexagonal is obtained. From the hexagonal, six equations can be used to form the MYCIN function. The six equations apply to six symmetric sectors of this hexagon. FIG. 5a shows the response surface of the hexagonal structure. It is the symmetry of the six sectors that leads to the evidential aggregation function of this invention. One such response surface is shown in FIG. 5b and is defined as:

$$x+y+z+xyz=0 \qquad (1)$$

Rearranging equation 1 results in the following:

$$z + xyz = -(x + y) \qquad (2)$$

$$z = -\frac{x+y}{1+xy} \qquad (3)$$

A change of axis results in the evidence aggregation function which is defined as:

$$f(x, y) = \frac{x+y}{1+xy} \qquad (4)$$

The definition of the evidence aggregation function can be applied for multiple evidence inputs and is defined as:

$$f(x_1,x_2,x_3,\ldots) = f(f(x_1,x_2),x_3\ldots) \qquad (5)$$

The evidential aggregation function has properties similar to the MYCIN function such as evidence retraction, which is defined as:

$$f(x_1, x_2, -x_2) = f(f(x_1, x_2), -x_2) \qquad (6)$$

$$= f\left(\frac{x_1, x_2}{1+x_1x_2}, -x_2\right) \qquad (7)$$

$$= \frac{\frac{x_1+x_2}{1+x_1x_2} - x_2}{1 + \frac{x_1+x_2}{1+x_1x_2}(-x_2)} \qquad (8)$$

$$= \frac{x_1 + x_2 - x_2 - x_1x_2{}^2}{1 + x_1x_2 - x_1x_2 - x_2{}^2} \qquad (9)$$

$$= x_1 \qquad (10)$$

Another property that the evidential aggregation function has that is similar to the MYCIN function is the associative property, which is defined as:

$$f(f(x_1, x_2), x_3) = \frac{\frac{x_1+x_2}{1+x_1x_2} + x_3}{1 + \frac{x_1+x_2}{1+x_1x_2}(x_3)} \qquad (11)$$

$$= \frac{x_1 + x_2 + x_3 + x_1x_2x_3}{1 + x_1x_2 + x_1x_2 + x_2x_3} \qquad (12)$$

$$= \frac{x_1 + \frac{x_2+x_3}{1+x_2x_3}}{1 + (x_1)\frac{x_2+x_3}{1+x_2x_3}} \qquad (13)$$

$$= f(x_1, f(x_2, x_3)) \qquad (14)$$

Another benefit of this evidential aggregate function as compared to the MYCIN function is that multiple evidence aggregation can be handled by one single equation which unfolds the recursion set forth in equation 5. For instance, an example having four evidence inputs would have the following relationship:

$$f(x_1, x_2, x_3, x_4) = f(f(x_1, x_2), f(x_3, x_4)) \qquad (15)$$

$$= \frac{\frac{x_1+x_2}{1+x_1x_2} + \frac{x_3+x_4}{1+x_3x_4}}{1 + \frac{x_1+x_2}{1+x_1x_2}\frac{x_3+x_4}{1+x_3x_4}} \qquad (16)$$

$$= \frac{(x_1+x_2)(1+x_3x_4) + (x_3+x_4)(1+x_1x_2)}{(1+x_1x_2)(1+x_3x_4) + (x_1+x_2)(x_3+x_4)} \qquad (17)$$

$$= \frac{x_1 + x_2 + x_3 + x_4 + x_1x_2x_3 + x_1x_2x_4 + x_1x_3x_4 + x_2x_3x_4}{1 + x_1x_2 + x_1x_3 + x_1x_4 + x_2x_3 + x_2x_4 + x_3x_4 + x_1x_2x_3x_4} \qquad (18)$$

The numerator and denominator of equation 18 are the odd and even terms, respectively, of the Kolmogorov-Gabor polynomial. Thus, the evidential aggregation function for any number of evidence inputs is:

$$f(x_1, x_2, x_3, \ldots) = \qquad (19)$$

$$\frac{x_1 + x_2 + x_3 + \ldots + x_1x_2x_3 + x_1x_2x_4 + \ldots + x_1x_2x_3x_4x_5 + \ldots}{1 + x_1x_2 + x_1x_3 + \ldots + x_1x_2x_3x_4 + \ldots + x_1x_2x_3x_4x_5x_6 + \ldots}$$

The partial derivative of the evidence aggregation function with respect to any one of its inputs has a representation of:

$$\frac{\partial f(x_1, x_2, x_3, \ldots)}{\partial x_i} = \frac{1}{D^2} \prod_{n \neq i}(1 - x_n{}^2), \text{ wherein} \qquad (20)$$

$$D = 1 + x_1x_2 + x_1x_3 + \ldots + x_1x_2x_3x_4 + \ldots \qquad (21)$$

The closed form representation of the evidence aggregation function as well as the closed form representation of the partial derivative of the evidence aggregation function with respect to one of its inputs cannot be obtained with the MYCIN function.

Figure 6:
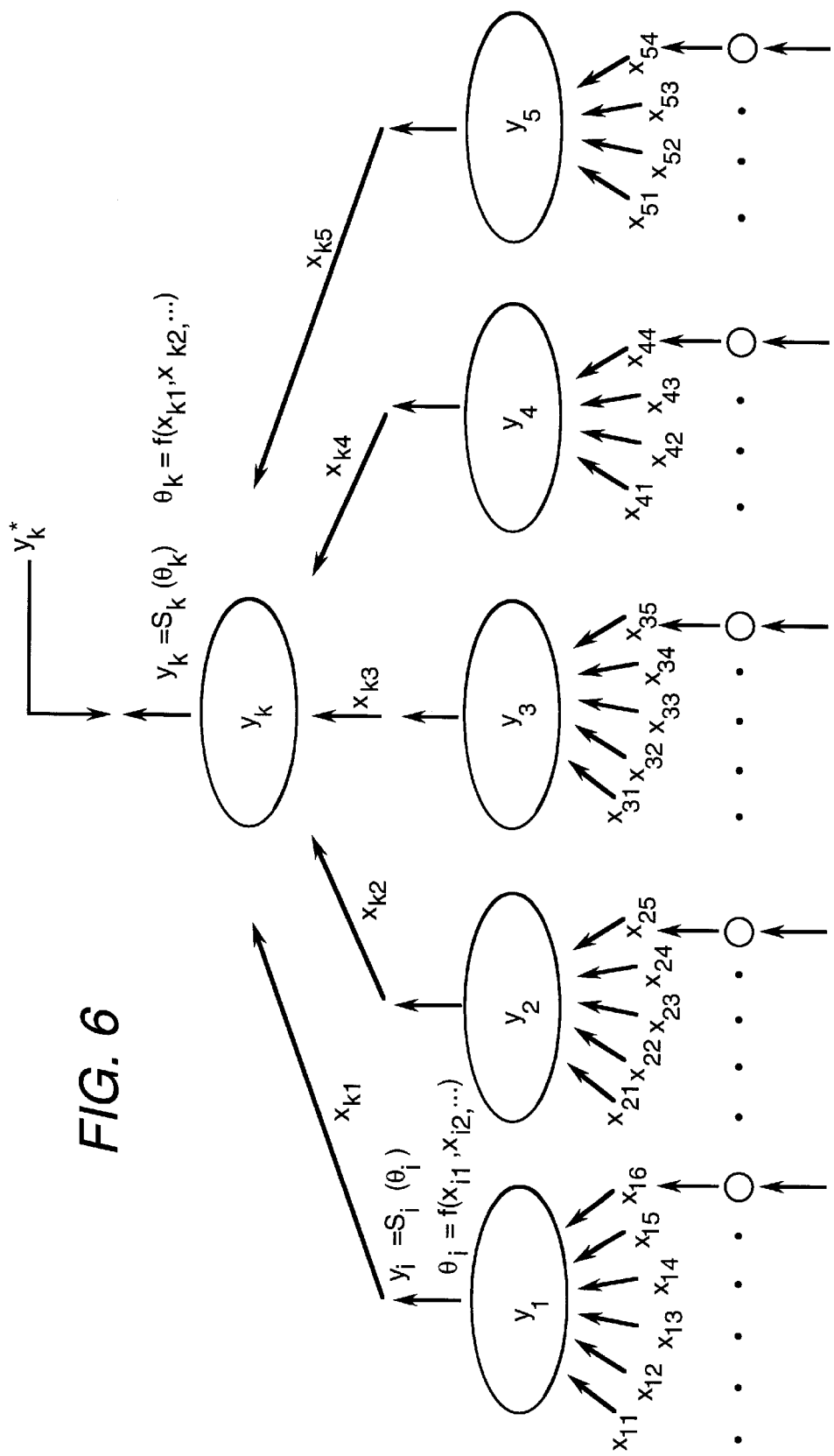
FIG. 6 shows the model structure with a weighting function S.

In order to overcome any weaknesses or inefficiencies during the translation of the linguistic evidential values to the numeric values at the inputs of the input layer processing nodes and the mapping of the aggregate numeric value to the linguistic evidential value at the output, this invention combines the numeric to linguistic evidential value mapping at the output of the input layer processing nodes with the linguistic evidential value to numeric translation at the input of the output layer processing node. This is achieved by using a weighting function, S, that is placed after the evidence aggregation function. This rearrangement is possible since the example-based evidential reasoning system 10 is a tree structure rather than a network structure. With a tree structure, the outputs of the input layer processing nodes are fed to one input of the output layer processing node. In order to map the numeric value to a linguistic evidential value and translate the linguistic evidential value to a numeric value, the weighting function, S, is a stepwise function. In general, the weighting function, S, is a transformation (i.e., linear or nonlinear) from the [−1,1] space to the [−1,1] space. The parameters of the weighting function, S, are called weights, denoted by w. The input of the weighting function S is denoted by θ, which is the aggregated evidence value. FIG. 6 shows the weighting function, S, in use with the model structure 24 in both the input layer and the output layer.

The model structure 24 is optimized by using a gradient descent method. Gradient descent methods are well known and any method such as the conjugate-gradient method, the Fletcher-Reeves method, or the like can be used. In this invention, the gradient descent method arrives at a gradient of the error surface in the space of weights. This method uses a set of weights or weight vector as a starting point. The initial weight vector is generated by a pseudo-random number generator having a uniform distribution between −0.1 and 0.1. First the error surface, E, is defined as:

$$E = \frac{1}{2} \sum_i (y_i - y_i^*)^2, \text{ wherein} \tag{22}$$

$y_i$ is the i-th output of the example-based evidential reasoning system 10 and the asterisk (i.e., *) denotes a desired output value, corresponding to an expert opinion. It is within the scope of this invention to use other error functions if desired.

The gradient descent optimization attains a weight vector that minimizes the error surface, E. One simple applied descent method is a stepwise gradient descent, where given an initial starting position in weight space, the next position would be a constant proportion of the gradient at the current position, and in the negative direction of the gradient, from the current position. The stepwise gradient descent method iterates repeatedly until a stopping criteria (e.g., gradient is smaller than a constant) is reached. Therefore, any weight function $S_i$ with parameters $w_{i1}, w_{i2}, \ldots$ is defined as:

$$\Delta w_{im} \propto -\frac{\partial E}{\partial w_{im}} = -\frac{\partial E}{\partial y_i} \frac{\partial y_i}{\partial w_{im}} \tag{23}$$

$$= (y_i^* - y_i) \frac{\partial S_i(\theta_i)}{\partial w_{im}} \text{ for the } i\text{-th output node}; \tag{24}$$

$$= \sum_k \left( -\frac{\partial E}{\partial y_k} \frac{\partial y_k}{\partial y_i} \right) \frac{\partial S_i(\theta_i)}{\partial w_{im}} \text{ for the } i\text{-th} \tag{25}$$
inner node connected to the k-th node in the next layer;

$$\frac{\partial y_k}{\partial y_i} = \frac{\partial y_k}{\partial \theta_k} \frac{\partial \theta_k}{\partial y_i} \tag{26}$$

$$= \frac{\partial S_k(\theta_k)}{\partial \theta_k} \frac{\partial \theta_k}{\partial y_i} \tag{27}$$

$$= S_k'(\theta_k) \frac{\partial \theta_k}{\partial y_i} \tag{28}$$

$$= S_k'(\theta_k) \frac{\partial f(x_{k1}, x_{k2}, \ldots)}{\partial y_i} \tag{29}$$

$$= S_k'(\theta_k) \frac{\partial f(x_{k1}, x_{k2}, \ldots)}{\partial x_{kj}} \tag{30}$$

-continued $$= S_k'(\theta_k) \frac{1}{D^2} \sum_{n \neq j} (1 - x_{kn}^2) \tag{31}$$

$$D = 1 + x_{k1}x_{k2} + x_{k1}x_{k3} + \ldots + x_{k1}x_{k2}x_{k3}x_{k4} + \ldots \tag{32}$$

The above gradient descent optimization can be summarized as follows:

$$-\frac{\partial E}{\partial w_{im}} = \delta_i \frac{\partial S_i(\theta_i)}{\partial w_{im}}$$

$$\delta_i = (y_i^* - y_i)$$

$$\delta_i = \sum_k \delta_k S_k'(\theta_k) \frac{1}{D^2} \prod_{n \neq j} (1 - x_{kn}^2)$$

$$D = 1 + x_{k1}x_{k2} + x_{k1}x_{k3} + \ldots + x_{k1}x_{k2}x_{k3}x_{k4} + \ldots$$

The above-defined evidence aggregation function and the weighting function form a numeric to numeric system. These functions enable the linguistic based examples gathered from the experts to be converted to numeric values for self-learning purposes. Thus, for each linguistic output from a processing node in the model structure a distinct numeric value between −1.0 and 1.0 is assigned. Through self-learning the weights in the weighting function, S, are adjusted to best approximate the assigned numeric value. For each linguistic input in a processing node, a distinct numeric value between −1.0 and 1.0 is assigned. A extra node having a single input is placed between the input and the system and is shown in FIG. 6. Since the evidence aggregation function has only one input, the assigned numeric value passes through unchanged to the weighting function. Through self-learning, the weights in the weighting function are adjusted to best transform the assigned numeric value to a linguistic evidence value.

After the self-learning phase has been completed, the example-based reasoning system 10 is ready to be used in production. In the production phase 14, a financial service application is retrieved from the data storage unit 22. The data from the financial service application is entered into the model structure 24 and the evidence in the application is weighed at the evidential reasoning unit 26. A recommendation along with an explanation is then made at the recommendation unit 28. The recommendation and explanation are then returned to the person examining the financial service application. Consequently, the examiner can then dispose the financial service application and store the information in the application for further use. After a couple of years, the data from the financial service application can be used in the self-learning phase and then implemented to help review future financial service applications.

An example of a financial service application evaluated in the production phase 14 is shown in FIG. 7. In this example, the input layer processing nodes are residence stability, employment stability, debt, credit, and miscellaneous. The attribute variables for the residence stability processing node are the years at the current residence, the years at the previous address, and residence type. The attribute variables for the employment stability processing node are the years at the current employment, the years at the previous employment, occupation code, and annual income. The attribute variables for the debt processing node are the disposable income, income/capital, long term debt ratio, and debt ratio. The attribute variables for the credit processing node are the number of inquiries, number too new, the number of derogatory remarks, the number of trades that were 30 days late, the number of trades that were 60 days late, the number of trades that were 90 days late, the number of bank loans, the number of finance loans, and the number of revolving loans. The attribute variables for the miscellaneous processing node are the number of dependents, previous vehicle, bankrupt, and regional branch of company.

The linguistic evidential values for each of these attributes in the input processing nodes are shown in the value column of FIG. 7. These values are translated to numeric values and are shown in the input column. The aggregated evidential value for each input processing node are shown in the evidence column. The value that is outputted from each of the input layer processing nodes are shown in the output column. These values are used as inputs to the output layer processing node. The aggregated evidential value for the output processing node is shown in the evidence column under the second level node. The value that is outputted from the output layer processing node is shown in the output column in the bottom right hand corner of FIG. 7. In this example, the application has an output 0.98308, which is an indication of strong credit worthiness. Using the example-based reasoning system 10 to review a financial service application enables the application to be analyzed with a decision approving or rejecting the application within a few minutes, as opposed to 15–45 minutes associated with the traditional approach of evaluating an application.

It is therefore apparent that there has been provided in accordance with the present invention, a method for building a self-learning evidential reasoning system that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

I claim:

1. A method for building a self-learning evidential reasoning system comprising the steps of:

defining a hierarchical model structure for the self-learning evidential reasoning system, the hierarchical model structure having a plurality of processing nodes each having a set of inputs and an output, wherein outputs from lower level processing nodes are propagated as inputs to higher level processing nodes until a final output is generated from the highest level processing node in the hierarchical model structure;

specifying a number of attributes for each of the plurality of processing nodes, each attribute describing a factor to be considered by that processing node;

specifying a number of possible linguistic evidential values for each of the attributes;

collecting a plurality of examples for each of the processing nodes in the hierarchical model structure, each of the plurality of examples having a set of inputs and a corresponding desired output; and training the processing nodes with the plurality of examples such that the model structure learns to generate a final output from a set of inputs, the model structure being trained to have minimal error between the final output and the desired output for the plurality of examples, the training comprising the steps of:

providing a linguistic evidential value for each of the inputs in the plurality of examples;

translating the linguistic evidential values into an evidential numeric value;

determining a weighting function for each processing node for aggregating the evidential numeric values into an evidential numeric aggregate value; and optimizing the weighting functions for each of the processing nodes in the model structure until there is minimal error between the final output and the desired output for the plurality of examples.

2. The method according to claim 1, further comprising placing the trained model structure into production for evaluating a new set of inputs.

3. A method for building a self-learning evidential reasoning system for performing risk and credit analysis of financial service applications, the method comprising the steps of:

defining a hierarchical model structure for performing risk and credit analysis of financial service applications, the hierarchical model structure having an input layer of processing nodes and an output layer having a processing node coupled to each of the processing nodes in the input layer;

collecting a plurality of examples from a plurality of previously approved financial service applications, each example having a set of inputs and a corresponding desired output;

organizing the plurality of examples into a plurality of groups used to perform risk and credit analysis;

applying each of the plurality of groups to separate input layer processing nodes; and training the processing nodes with the plurality of groups such that the model structure learns to generate a final output from a set of inputs, the model structure being trained to have minimal error between the final output and the desired output for the plurality of examples, the training comprising the steps of:

providing a linguistic evidential value for each of the inputs in the plurality of examples;

translating the linguistic evidential values into an evidential numeric value;

determining a weighting function for each processing node for aggregating the evidential numeric values into an evidential numeric aggregate value; and optimizing the weighting functions for each of the processing nodes in the model structure until there is minimal error between the final output and the desired output for the plurality of examples.

4. The method according to claim 3, wherein the plurality of groups comprise employment stability, residential stability, credit history, debt and income history, and miscellaneous variables.

5. The method according to claim 3, further comprising providing data from a recently filed financial service application to the trained model structure for evaluation.

6. The method according to claim 5, further comprising the step of accumulating additional data from previously filed financial service applications and training the model structure therewith.

* * * * *